United States Patent [19]
Perrella

[11] Patent Number: 5,205,339
[45] Date of Patent: Apr. 27, 1993

[54] DIE-CASTING MACHINE

[75] Inventor: Guido Perrella, Westmount, Canada

[73] Assignee: DBM Industries Limited, Quebec, Canada

[21] Appl. No.: 768,584

[22] PCT Filed: Mar. 20, 1990

[86] PCT No.: PCT/CA90/00094
§ 371 Date: Sep. 17, 1991
§ 102(e) Date: Sep. 17, 1991

[87] PCT Pub. No.: WO90/11151
PCT Pub. Date: Oct. 4, 1990

[30] Foreign Application Priority Data

Mar. 21, 1989 [CA] Canada ................................ 5943817

[51] Int. Cl.$^5$ .............................................. B22D 17/10
[52] U.S. Cl. ........................................ 164/113; 164/131; 164/314; 164/320; 164/321; 164/343; 164/344
[58] Field of Search ............... 164/113, 120, 131, 312, 164/313, 314, 316, 317, 318, 319, 320, 321, 344, 343

[56] References Cited

U.S. PATENT DOCUMENTS

| 1,724,332 | 8/1929 | Will et al. | 164/343 |
| 3,344,848 | 10/1967 | Hall et al. | 164/319 |
| 4,013,116 | 3/1977 | Perrella | 164/262 |
| 4,779,666 | 10/1988 | Ruhlandi et al. | 164/120 |

FOREIGN PATENT DOCUMENTS 0055727 3/1984 Japan .................................. 164/343

Primary Examiner—Richard K. Seidel
Assistant Examiner—Erik R. Puknys

[57] ABSTRACT

A die-casting machine is described which includes at least one cylinder/piston assembly. Each assembly has main, ejector and core pistons and cylinders. The main cylinder is stationary and holds a piston which reciprocates to bring the molds together for metal injection or apart for releasing a die casting. A portion of the interior of the main piston constitutes an ejector cylinder having an ejector piston and a portion of the interior of the ejector piston constitutes a core cylinder having a core piston. The present invention is more compact and less complex than conventional die-casting machines.

8 Claims, 1 Drawing Sheet

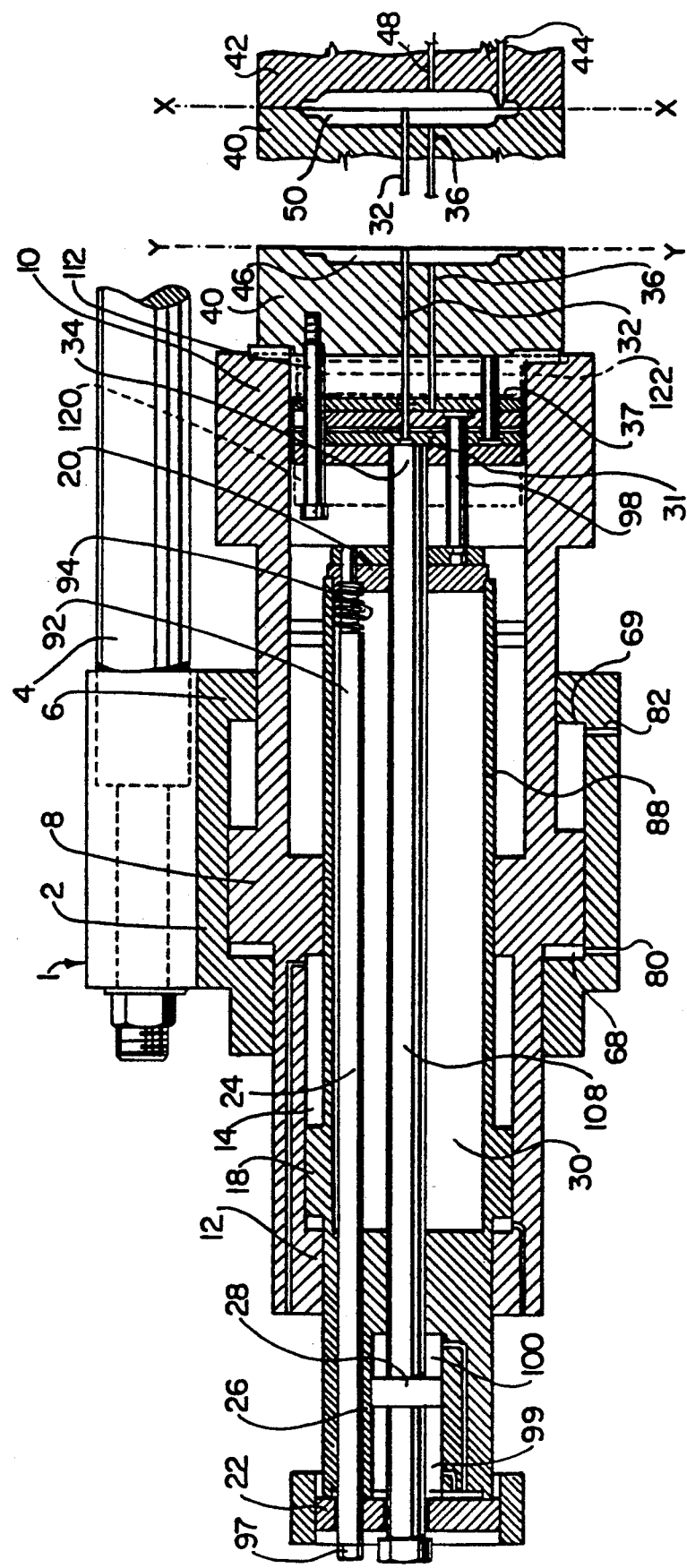

DIE-CASTING MACHINE

This invention relates to a die casting machine wherein the ejector mechanism is telescoped within the main piston and the core mechanism is telescoped within the ejector cylinder where both the ejector mechanism and core mechanism travel with the main piston.

In a conventional die casting machine a frame is provided and a fixed or stationary plate upon which one-half of the mold for making the part is mounted on the frame. The other half of the mold is mounted upon a moving plate which allows the cast part to fall out of the machine when in the open position and the moving plate is clamped shut with sufficient force to contain the molten metal while the mold is being filled. In operation, the part separates from the half mold on the fixed plate (the cover half) and is retained on the half mold of the moving plate (the ejector half) as it moves open following solidification of the molten metal which was injected into the mold cavity. The part which was retained on the moving or ejector half of the mold must then be ejected from it to fall out or be transferred out of the machine. The one-sided motion described above is one of the major causes for the various and complicated types of automatic part-transfer mechanisms associated with conventional casting machines which have been retrofitted with some sort of part-transfer. The same problem then arises as the part is indexed to a secondary operation such as trimming wherein a similar one-sided machine is used. The part-transfer carrier is required to have both an indexing function and a lateral movement to match the plate closing and opening stroke as the part is brought into a fixed position for the desired operation.

This conventional form of machine was greatly improved upon by the machine shown in the U.S. Pat. to Perrella, 4,013,116 which issued on Mar. 22, 1977. This machine is much simpler than conventional devices in that the part was cast, indexed and removed from the machine for trimming without any lateral movement of the part. During processing the part is in a fixed plane and is transferred in that plane. The casting machine has balanced forces in which both plates and mold halves or dies are moved equal distances to and from the part plane and this balanced movement of mass cancels out the normal shock of starting and stopping heavy plates and tools, equalizes thermal expansion differences and automatically centers load deflections.

The machine described in U.S. Pat. No. 4,013,116 consists of a frame, mold mounting plates and hydraulic closing and opening cylinders having a simple deceleration system to eliminate closing shock. A mold configuration is provided and is adaptable to a large variety of part styles and is of pre-determined registry in the machine plates so as to eliminate mold miss-match because of thermal expansion of poor die set practices. Metal-injection of the machine is provided with an infinitely variable control capable of presetting to any desired speed or pressure, together with a self-contained molten metal supply with electric resistance heaters therein.

A self-contained hydraulic power system is incorporated, using fire-resistant fluid. Provision is made to pre-heat the molds prior to the first shot. The machine features a self-contained heat unit for cooling the molds and eliminating lime deposits in the cooling passages all of which is automatically connected to the mold during installation without hoses or pipes.

While the machine of Perrella et al is in commercial use, there is a need for a more compact design wherein the same performance is achieved with fewer individual components thus reducing the number of precision components necessary.

According to one embodiment of the present invention there is provided a die-casting machine of the balanced dual movement type in which both halves of the molds or dies are moved equal distances from the part plane comprising:

a) two stationary, main cylinders,
b) support means for mounting front ends of the stationary, main cylinders in spaced, face-to-face relationship, and for each stationary, main cylinder,
c) a hollow, main piston having an open front end and a rear wall, and slidable in that main cylinder from a forward mold halves engaging position to a retracted, mold halves separated position, the hollow forming a casting ejector cylinder,
d) a mold half mounting means attached to the front end of the main piston,
e) a hollow casting ejector piston having front and rear walls and slidably mounted for telescoping movement in the casting ejector cylinder,
f) a core cylinder attached to a central portion of the rear wall of the ejector piston,
g) a core piston slidably mounted telescoping movement in the core cylinder and extending forwardly along the hollow of the ejector piston to slidably extend through a central portion of the front wall of the ejector piston,
h) a core plate attached to a front end of the core piston for movement therewith, a core rod or rods attached to the core plate and slidably extending through the mold half mounting means,
i) an ejector plate attached to a front end of the ejector piston for movement therewith, an ejector rod or rods attached to the ejector plate and slidably extending through the mold half mounting means, whereby, in operation
  i) with both mold halves held closed together at a molding plane by fluid in their respective main cylinders urging the main cylinders forwardly with a predominant force provided by one of the main cylinders,
  ii) the core pistons are moved forwardly by fluid pressure in their respective core cylinders to place the core rods in the cavity between the mold halves,
  iii) the ejector rods are held rearwardly in their respective mold halves, flush with the cavity wall surface thereof by fluid pressure in the respective casting ejector cylinder, and
  iv) a die casting is cast in the mold cavity,
  v) the core pistons and core plate are moved rearwardly by fluid pressure in the core cylinders to remove the core rods from the mold halves, and then
  vi) with the ejector rods resiliently held forwardly by fluid pressure in their respective casting ejector cylinders, the mold halves are moved rearwardly by fluid pressure in their respective main cylinders so that the ejector rods dislodge the die casting from the mold halves.

According to another embodiment of the present invention there is provided a die casting machine having one fixed mold mounted to the frame and one travelling mold mounted on a reciprocating piston, said die casting machine having reciprocating main, ejector and core pistons wherein there is at least one stationary main cylinder, at least one reciprocating main piston which brings the molds together for metal injection or apart for releasing a die casting, said main piston having telescoped therein an ejector cylinder, an ejector piston in said ejector cylinder, said ejector piston having telescoped therein a core cylinder and a core piston in said core cylinder.

In the accompanying drawing which illustrates, by way of example, an embodiment of the present invention, there is shown a partly sectioned side view of one half of a die-casting machine of the balanced dual movement type in which the other half of the machine not shown is identical.

Generally designated 1, the machine comprises:
a) two stationary, main cylinders, one of which is shown and designated 2,
b) support means, in the form of two spaced, parallel tie bars, one of which is shown and designated 4, for mounting front ends of the stationary, main cylinders, such as front end 6 of main cylinder 2, in spaced face-to-face relationship, and for each stationary, main cylinder such as 2
c) a hollow, main piston 8 having an open front end 10 and a rear wall 12, and slidable in that main cylinder 2 from a forward mold halves engaging position in plane XX to a retracted mold halves separated position in plane YY, the hollow 14 forming a casting ejector cylinder,
d) a mold half 40 mounting means attached to the front end of the main piston 8,
e) a hollow, casting ejector piston 18 having front and rear walls 20 and 22 respectively, and slidably mounted for telescoping movement in a front end 10 of the main piston 8,
f) means, generally designated 24, for resiliently urging the ejector piston 18 out of the casting ejector cylinder 14,
g) a core cylinder 26 attached to a central portion of the rear wall 22 of the ejector piston 18,
h) a core piston 28 slidably mounted for telescoping movement in the core cylinder 26 and extending forwardly along the hollow 30 of the ejector piston 18 to slidably extend through a central portion of the front wall 20 of the ejector piston 18,
i) a core plate 31 attached to a front end 34 of the core piston 28 for movement therewith, a core rod or rods 32 attached to the core plate 31 and slidably extending through the mold half mounting platen 16,
j) an ejector rod or rods 36 attached to the ejector plate 37 mounted on the front end 38 of the ejector piston 18 for movement therewith, the rod or rods 36 slidably extending through the mold half mounting means, whereby, in operation
 i) with both mold halves 40 and 42 shown chain-dotted held closed together at a molding plane XX by fluid in their respective main cylinders, such as 2, urging the main cylinders forwardly with a predominant force provided by one of the main cylinders,
 ii) the core pistons, such as 28, held forwardly by fluid pressure in their respective core cylinders, such as 26, to place the core plate 31 as shown in a forward position such that core rod 32 enters into the cavity 46 between the mold halves 40 and 42,
 iii) the ejector plate 37 as shown is held rearwardly such that ejector rods 36 and 48 are maintained flush with the cavity wall surface in their respective mold halves 40 and 42 respectively by fluid pressure in the respective casting ejector cylinder, such as 14, and
 iv) a die casting 50 cast in the mold cavity 46,
 v) the core pistons, such as 28, may be moved rearwardly by fluid pressure in the core cylinders, such as 26, to remove the core plate 31 and core rods 32 and 44 from cavity 46 between the mold halves 40 and 42, the core plate 31 may be adjusted by adjusting the length of the piston using the bolt on the piston which extends from the back of the machine, and then
 vi) the mold halves 40 and 42 are moved rearwardly by fluid pressure in their respective main cylinders, such as 2, while the ejector plate 37 and ejector rods 46 and 48 are moved forwardly by fluid pressure in their respective casting ejector cylinder 14, so that the ejector rods 36 and 48 dislodge the die casting 50 from their respective mold halves 40 and 42.

The stroke of the main piston 8 is limited between the end faces 68, 69 of cylinder 2. The cylinder has fluid inlet ports 80 and 82.

The mold half 40 is attached to the front end 10 of the main piston 8 by conventional means.

The hollow, casting ejector piston 18 comprises a cylinder 88, front wall plate 20 and rear wall collar 22.

The means 24 resiliently urging the ejector piston 18 out of the casting ejector cylinder 14 comprises a rod 92 for urging the rear wall collar 22 rearwardly by means of a compression spring 94. The other end of ejector rod 92 extends through the rear wall of collar 22 to which it is adjustably fastened by adjusting nuts 97. The front end of ejector piston 20 is connected by spacer 98 to ejector plate 37. Ejector rod or rods 36 are attached to an ejector plate 37. The ejector plate is slidable on guide pins, such as 112. By externally adjusting the adjusting nuts 97, the ejector plate 37 and ejector rods 36 may be adjusted relative to the face of mold half 40.

The stroke of the core cylinder 26 is limited between the end faces 99, 100 of the core cylinder. Fluid ports are provided at each end 99, 100 of the core cylinder 26.

The core piston 28 includes a rod 108 extending forwardly along the hollow 30 of the ejector piston 18 to slidably extend through a central portion of the front wall 20 of the ejector piston 18.

The core rods 32 are mounted on a core plate 31 which is mounted on the leading end of the rod 108 for movement therewith. The core plate 31 is slidably located relative to the mold 40 by a plurality of guide pins secured to the mold securing means, one of which is shown and designated 112.

From the description it will be seen that when the main piston 8 is moved relative to the main cylinder 2, the ejector cylinder 14 and the core retracting cylinder 26 both move with the main piston 8. However, the ejector piston 18 and the core piston 28 may both be moved independently of each other and relative to the main piston 8 along their respective cylinders 14 and 26 respectively.

The rear position of the core plate 31 is shown in dotted outline and designated as 120 and the forward position of the ejector plate 37 is shown in dotted outline and designated as 122.

It will be appreciated that mold halves 40 and 42 may be of the type described in U.S. Pat. No. 4,637,451 dated Jan. 20, 1987, Perrella et al; also, the molten metal supply and injection system, and the die casting transfer system may be of the type disclosed in U.S. Pat. No. 2,009,645 dated Sep. 20, 1979, Perrella et al.

While the instant invention has been primarily described herein with respect to die casting machines of the balanced dual movement type in which both halves of the molds or dies are moved equal distances from the part plane utilizing two opposed stationary main cylinders for reciprocating main pistons which bring the molds together for metal injection, it will be recognized by those skilled in the art that this invention may also be incorporated in rebuilding of conventional die casting machines in which a fixed or stationary plate is mounted on one half of the frame upon which one half of the mold is mounted. The other half of the mold is mounted on a moving piston. The moving cylinder of conventional machines may be replaced by a main piston having an ejector piston and core piston telescoped therein for movement therein as disclosed in this application without deviating from the scope of this invention.

I claim:

1. A die casting machine (1) having reciprocating main (8), ejector (18) and core pistons (28), wherein there is at least one stationary main cylinder (2), at least one reciprocating main piston (8) which brings the molds (40, 42) together for metal injection or apart for releasing a die casting, characterized by a portion of the interior of said main piston (8) constituting an ejector cylinder (14), with an ejector piston (18) in said ejector cylinder (14), a portion of the interior of said ejector piston constituting a core cylinder (26), with a core piston (28) in said core cylinder (26).

2. The die casting machine of claim 1 in which the ejector piston (18) is connected to an ejector plate (37), and means are provided for adjusting the longitudinal position of the ejector piston (18) and the ejector plate (37).

3. The die casting machine of claim 2 in which the core piston (28) extends from the back of the machine, means for connecting the core piston (28) to the core plate (31) and means are provided for adjusting the longitudinal position of the core piston (28) and core plate (31).

4. A die casting machine of the balanced dual movement type in which the molds (40, 42) are moved equal distances from the part plane, two opposed stationary main cylinders (2) for reciprocating main pistons (8) which bring the molds (40, 42) together for metal injection, or apart for releasing a die casting, characterized by a portion of the interior of each main piston (8) constituting an ejection cylinder (14), with an ejector piston (18) in each ejector cylinder (14), a portion of the interior of said ejector pistons (18) constituting a core cylinder (26), with a core piston (28) in said core cylinder (26).

5. The die casting machine of claim 4 in which the ejector piston (18) is connected to an ejector plate (37), and means are provided for adjusting the longitudinal position of the ejector piston (18) and the ejector plate (37).

6. The die casting machine of claim 5 in which the core piston (28) extends from the back of the machine, means for connecting the core piston (28) to the core plate (31) and means are provided for adjusting the longitudinal position of the core piston (28) and core plate (31).

7. A method of operating a die casting machine (1) having reciprocating main (8), ejector (18) and core pistons (28) wherein there is at least one stationary main cylinder (2), at least one reciprocating main piston (8) which brings the molds (40, 42) together for metal injection or apart for releasing a die casting, characterized by a portion of the interior of said main piston (8) constituting an ejector cylinder (14), with an ejector piston (18) in said ejector cylinder (14), an ejector plate (37) attached to said ejector piston (18), ejector rods (36) attached to said ejector plate (37), a portion of the interior of said ejector piston constituting a core cylinder (26), with a core piston (28) in said core cylinder (26), a core plate (31) attached to said core piston (28), core rods (32) attached to said core plate (31) comprising the steps of applying fluid pressure in said stationary main cylinder (2) to move the main piston (8) and close the molds (40, 42) while transporting the ejector cylinder (14) and core cylinder (26), applying fluid pressure in said core cylinder (26) to place the core rod or rods (32) in the cavity between the molds (40, 42), retaining fluid pressure in the ejector cylinder (14) so that said ejector rods (36) are flush with the mold surface, injecting a casting in the mold cavity, reversing the fluid pressure in the core cylinder (26) to retract the core rods (32) from the molds (40, 42), reversing the fluid pressure in the main cylinders (2) to remove the main pistons (8) from the part plane while applying fluid pressure to the ejector cylinder (14) to advance the ejector piston (18) and push the casting from the mold, reversing the fluid pressure in the ejector cylinder (14) to return the ejector piston (18) and ejector rods (36) to their starting position.

8. A method of operating a die casting machine of the balanced dual movement type in which both molds (40, 42) are moved equal distances from the part plane, two opposed stationary main cylinders (2) for reciprocating main pistons (8) which bring the molds (40, 42) together for metal injection, or apart for releasing a die casting, characterized by a portion of the interior of each main piston (8) constituting an ejection cylinder (14), with an ejector piston (18) in each ejector cylinder (14), a portion of the interior of said ejector pistons (18) constituting a core cylinder (26), with a core piston (28) in said core cylinder (26), said core pistons (28) each attached to respective core rods (32), comprising the steps of applying fluid pressure in said main cylinders (2) to move the main reciprocating pistons (8) forwardly and close the molds on the part line while transporting the ejector cylinders (14) and core cylinders 926) towards said part line, applying fluid pressure to said core cylinders (26) to move said core piston (28) forwardly and place the core rod or core rods (32) in the cavity between the molds, retaining fluid pressure on said ejector cylinders (14) so that the ejector rods (36, 48) attached to said core pistons (28) are flush with the mold surface, injecting a casting into the mold cavity, reversing the fluid pressure in the core cylinders (26) to retract the core pistons (28) and attached core rods (32) until the core rods (32) are retracted from the mold, reversing the fluid pressure in the main cylinders (2) to remove the molds (40, 42) attached to the main pistons (8) from the part plane, while applying fluid pressure to the ejector pistons (18) to advance the ejector pistons (18) and push the casting from respective molds on the part plane, reversing the fluid pressure in the ejector cylinder (14) to return the ejector pistons (18) and ejector rods (36, 48) to their retracted position.

* * * * *